United States Patent [19]

Rath

[11] Patent Number: 4,779,447
[45] Date of Patent: Oct. 25, 1988

[54] METHOD FOR DETERMINING THE COEFFICIENT OF FRICTION BETWEEN A VEHICLE TIRE AND A ROADWAY

[75] Inventor: Heinrich-Bernhard Rath, Vallendar, Fed. Rep. of Germany

[73] Assignee: Lucas Industries public limited company, Birmingham, England

[21] Appl. No.: 55,161

[22] Filed: May 28, 1987

Related U.S. Application Data

[63] Continuation-in-part of Ser. No. 860,470, May 7, 1986, abandoned.

[30] Foreign Application Priority Data

May 7, 1985 [DE]  Fed. Rep. of Germany ....... 3516399
Sep. 24, 1985 [DE]  Fed. Rep. of Germany ....... 3534022

[51] Int. Cl.⁴ ............................................. G01N 19/02
[52] U.S. Cl. ......................................................... 73/9
[58] Field of Search ............... 73/7, 8, 9, 146, 121, 73/129; 340/52 R; 342/109, 110, 111, 112, 118; 364/426, 561

[56] References Cited

U.S. PATENT DOCUMENTS

| | | | |
|---|---|---|---|
| 2,305,789 | 12/1942 | Kempf | 73/129 |
| 2,496,405 | 2/1950 | Foufounis | 340/52 R |
| 3,893,330 | 7/1975 | Shute et al. | 73/9 |
| 4,057,712 | 11/1977 | Sakakibara et al. | 364/426 |
| 4,098,111 | 7/1978 | Hardmark et al. | 73/9 |
| 4,132,991 | 1/1979 | Wocher et al. | 342/134 |
| 4,212,063 | 7/1980 | Hardmark | 73/9 |
| 4,545,240 | 10/1985 | Leiber | 340/52 R |
| 4,583,173 | 4/1986 | Odlen et al. | 340/52 R |
| 4,662,211 | 5/1987 | Strong | 73/9 |

Primary Examiner—Stewart J. Levy
Assistant Examiner—Robert R. Raevis
Attorney, Agent, or Firm—Scrivener and Clarke

[57] ABSTRACT

In a method for determining the coefficient of friction between a vehicle tire and a roadway one of the vehicle wheel is pressurized during normal brake operation at a higher pressure than another wheel. The rotational speed of the braked wheel is compared with the rotational speed of another non-braked wheel for determining the wheel slip. Furthermore, the axle load of the braked wheel is measured. On the basis of wheel slip, brake torque and axle load, the coefficient of friction is determined.

18 Claims, 3 Drawing Sheets

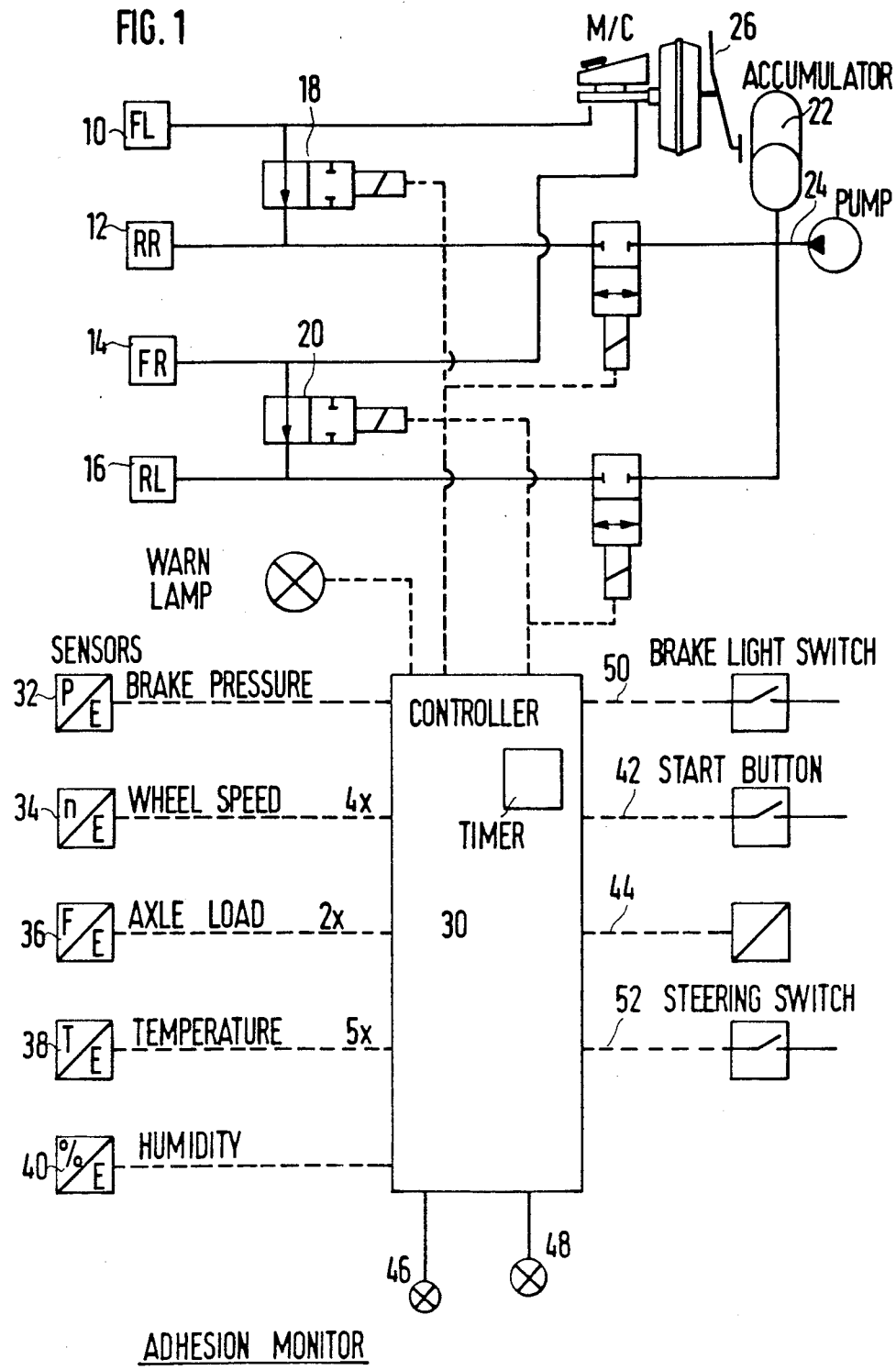

METHOD FOR DETERMINING THE COEFFICIENT OF FRICTION BETWEEN A VEHICLE TIRE AND A ROADWAY

This is a continuation-in-part of application Ser. No. 860,470, filed May 7, 1986, and now abandoned.

The invention relates to a method for determining the coefficient of friction (adhesive force) between a tire of a vehicle wheel and the roadway.

BACKGROUND OF THE INVENTION

High speed transportation, in particular on highways has created a demand for measuring surface friction between vehicle tires and the roadway.

Such a method is known from U.S. Pat. No. 45 45 240 to Leiber. In the known arrangement an anti-locking system which is provided for different reasons is used for automatically applying increasing test pressure to the brakes for determining the slip between a tire and a roadway. When a predetermined value of slip below a given test pressure value is reached, an alarm signal is emitted.

In the case of the arrangement known from Leiber, actual slip is compared with only one set value, and the display tells the driver whether the measured slip is greater or smaller than the set value. There is not continuous measuring and indication of the coefficient of friction between a tire and a roadway.

In U.S. Pat. No. 38 93 330 to Shute et al. an apparatus for measuring coefficients of friction between a tire of a braked vehicle wheel and a road surface is described which utilizes a special fifth wheel in addition to the normal four wheels of the vehicle. The coefficient of friction is determined by measuring both the speed of the vehicle at the time of brake engagement and the distance traveled by the vehicle after brake engagement. The total stopping distance of the vehicle as well as vehicle speed and distance are measured from which the coefficient of friction can be calculated.

In U.S. Pat. No. 42 12 063 to Hardmark a method for determining the coefficient of friction between a vehicle tire and a roadway is described in which, in addition to the normal wheels of the vehicle, an additional measuring wheel is required. The measuring wheel is pivotable mounted in the vehicle in a vertical plane and can be moved into contact with the roadway. The vertical forces acting on the measuring wheel are pre-programmed with a constant factor and the coefficient of friction is determined from the measured value of the tensional force acting on the measuring wheel. Said tensional force corresponds to the torque acting on the measuring wheel and, since the vertical load on the measuring wheel is programmed in as a constant factor, the signal represents the coefficient of friction between the tire and the roadway. The coefficient is not determined on the basis of measuring slip between the measuring wheel and another wheel.

OBJECTS AND SUMMARY OF THE INVENTION

It is an object of the invention to develop a method for determining the coefficient of friction between a vehicle tire and a roadway which yields accurate results with a minimum of equipment in addition to a normal antiskid braking system. It is another object of the invention to provide a method by which the driver of the vehicle can be informed of the actual value of the coefficient of friction of the roadway.

According to a first embodiment of the invention the coefficient of friction between a vehicle tire and a roadway is determined by the following steps:

(a) pressurizing during normal brake operation one of the vehicle wheels at a higher brake pressure than another wheel;

(b) comparing the rotational speed of said one wheel with the rotational speed of the other wheel for determining the wheel slip of said one wheel from the difference in the rotational speeds of the other wheel and said one wheel when the pressure on said one wheel reaches a value indicative of a predetermined braking torque on said one wheel;

(c) measuring the axle load on said one wheel; and (d) determining the coefficient of friction between the tire of said one wheel and said roadway from said measured axle load, said predetermined braking torque, and the inverse proportion of said determined wheel slip.

According to a second embodiment of the invention the above object is achieved by the following steps:

(a) pressurizing increasingly during normal brake operation one of the vehicle wheels at a higher brake pressure than another;

(b) comparing the rotational speed of said one wheel with the rotational speed of the other wheel for determining the wheel slip of said one wheel from the difference in the rotational speeds of the other wheel and said one wheel;

(c) terminating the pressurizing of said one wheel when said determined wheel slip of said one wheel reaches a predetermined value;

(d) measuring the brake pressure indicative of a braking torque at the time when said predetermined wheel slip is reached;

(e) measuring the axle load of said one wheel;

(f) determining the coefficient of friction between the tire of said one wheel and said roadway from said measured axle load, said measured brake pressure and said predetermined wheel slip.

The method according to the invention is performed on the basis of measuring the slip between a normal wheel of a vehicle which is braked during a normal brake operation at a higher brake torque than another wheel. If the wheel which is pressurized at a higher brake pressure than another wheel is called the "retarded wheel" and the other wheel is called a "free wheel", then the slip "s" between the one wheel and the other wheel is determined by the following formula:

$$s = \frac{V_{free\ wheel} - V_{retarded\ wheel}}{V_{free\ wheel}} \cdot 100\ [\%]$$

wherein $V_{retarded\ wheel}$ is the rotational speed of the wheel which is pressurized with a higher brake pressure than another wheel and $V_{free\ wheel}$ is the rotational speed of the other wheel.

The larger the coefficient of friction is between the roadway and the tire of the retarded wheel, the smaller the measured slip is. This can be made clear by the following considerations. If a wheel is braked with a predetermined brake torque (the brake torque being indicated by the brake pressure) then on a total slippery roadway, e. g. on ice, the slip between the retarded wheel (i.e. the one vehicle wheel which is pressurized at a higher brake pressure than the other wheel) will be very large since the coefficient of friction is very low.

On the other hand, on a roadway having very good gripping conditions the same braking operation will result in a very small slip. Therefore, the coefficient of friction $\mu$ is in inverse proportion with the measured slip.

Furthermore, it must be considered that the measured slip depends on the axle load acting on said one wheel which is pressurized at a higher brake pressure than another wheel. In other words, the measured slip is not only dependent on the coefficient of friction $\mu$ but also dependent on the axle load acting upon the retarded wheel. This also can be made clear by simple considerations. If it is assumed that all conditions are the same, i.e. same brake torque on the same road but different axle loads act upon the retarded wheel, a very large axle load will result in a strong interaction between the tire and the road. In other words, the force pressing the tire against the road will be larger as compared with a smaller axle load. Therefore, with a large axle load, the braked wheel will be forced to continue its rotation due to the interaction between the wheel and the road (the vehicle continues its motion), which means that with a large axle load the slip of the braked wheel will be small.

On the other hand, for a relatively small axle load, the interaction between the braked wheel and the road is relatively small since the force pressing the wheel against the road is small. The effect of the braking action on the retardion of the wheel is much more pronounced since the braked wheel is not forced that much (as compared to large axle load) to continue its rotation due to the interaction between the wheel and the road. Therefore, assuming in both cases the same brake torque, with a small axle load the slip will be much larger as compared with a large axle load.

As explained above the coefficient of friction $\mu$ is a function of slip "s", axle load "1", and brake torque "t":

$$\mu = f(s, 1, t).$$

According to the invention, the dependency of the coefficient of friction $\mu$ on slip s, axle load 1 and brake torque t can be calculated or determined experimentally and stored in a microprocessor which controls the determination of the coefficient of friction. In the experimental determination, the three variables slip s, axle load 1, and brake torque t are measured directly (the brake torque can be directly calculated from the brake pressure as is well-known in the art). The coefficient of friction $\mu$ is determined by a known and dependable method, e.g. as known from the above-cited prior art (Leiber, Shute or Härdmark).

Thus, in an actual measurement, the micooprocessor is prepared to calculate the coefficient of friction $\mu$ on the basis of any set of the three variables slip s, axle load 1, and brake torque t, the latter being indicated by the measured brake pressure.

One of the vehicle wheels is pressurized during normal brake operation at a higher brake pressure than another wheel, while the other wheel is not or less retarded by brake pressure.

According to another preferred embodiment of the invention, one wheel is pressurized during normal brake operation at a higher brake pressure than another wheel whereby said one wheel is pressurized with a brake pressure which is at a level and effective over a period of time so selected that the straight-on travel of the vehicle is substantially undisturbed. Said level of brake pressure can be varied automatically as a function of the vehicle speed. On the other hand, said braking period of time can be varied automatically as a function of vehicle speed.

If the coefficient of friction as determined in accordance with the present invention is below a predetermined value, an alarm can be optically and/or acoustically signalled to the driver.

According to the invention, it is possible to determine the coefficient of friction between two different vehicle tires and the roadway. This is of importance when the roadway is partly covered with ice. According to the invention, an alarm is signalled to the driver whenever a predetermined maximum difference between the coefficients of friction between the roadway and the tires of said two wheels is exceeded.

The selective retardation of individual wheels makes it possible, to investigate different ranges of the road as to their coefficient of friction. The driver is informed of the worse of these two values. Moreover, it may be indicated to the driver whether the coefficients of friction determined differ by more than a predetermined value. It is likewise possible to indicate both results of measurements (coefficient of frictions) seperately.

Preferably, the method for determining the coefficient of friction according to the invention is combined with determining a stopping distance to be expected from the coefficient of friction and the actual speed of the vehicle and indication said stopping distance to the driver so that he may adjust the vehicle speed to the traffic conditions.

According to the invention, the determination of the coefficient of friction between a vehicle tire and a roadway is performed during a normal brake operation. However, in case of a very abrupt emergency braking including very high brake pressure, in a preferred embodiment of the invention, the coefficient of friction is not determined. This is accomplished such that when the pressure in a master cylinder of the vehicle's brake system exceeds a predetermined value for a predetermined period of time, operation of a determination of the coefficient of friction is prevented.

In another preferred embodiment of the invention, the described method for determining the coefficient of friction is combined with a conventional radar distance warning system which measures the distance between the vehicle and another vehicle driving in front of it. The distance measured by the radar distance warning system is compared to the measured coefficient of friction and the speeds of both vehicles and an alarm is given, optically or acoustically, if a critical distance which depends on the coefficient of friction is fallen short off.

In another preferred embodiment of the invention, the determination of the coefficient of friction is prevented whenever a steering wheel of the vehicle is turned by a certain angle, i.e. the vehicle is driven in a curve. To this end, the steering wheel is provided with a steering angle switch to prevent switch-on of the measuring system when the steering wheel is turned. In this manner, the full braking capacity of all wheels in a curve is maintained.

Preferably, both the wheel which is pressurized at a higher brake pressure and the other wheel which is not braked or braked with a lower brake pressure are non-driven wheels of the vehicle.

In a further preferred embodiment of the invention, the axle load of said one wheel being pressurized at a higher brake pressure than another wheel is reduced by lifting said one wheel during pressurizing it. Motor vehicles are known in which it is possible to vary the level of one wheel as compared to that of the other wheels for reasons not related to the braking technique. It is especially advantegous and economical to apply the invention in vehicles of that kind.

As a method according to the invention may be applied with little expenditure in a vehicle equipped with an anti-skid system because the pump or pressure reservoir and the pressure switching valves thereof may be utilized for determining the coefficient of friction in accordance with the invention.

When the determination of the coefficient of friction in accordance with the invention is performed during normal brake operation, the driver will hardly notice the measurement taking place, if at all.

The invention will be described further, by way of example, with reference to the accompanying drawings in which:

BRIEF DESCRIPTION OF THE DRAWINGS

FIG. 1 is a block diagram of an apparatus for carrying out the method according to the invention;

DETAILED DESCRIPTION

Figure 3:
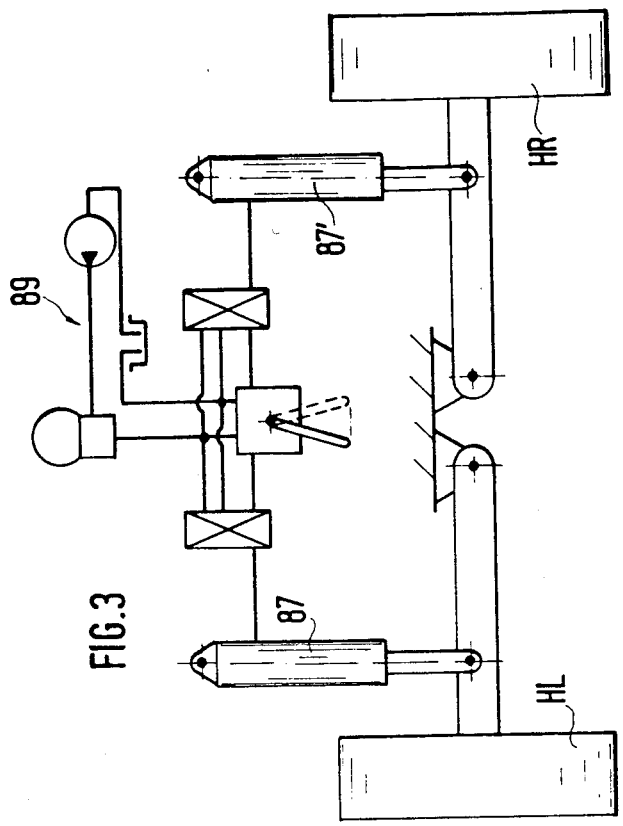
FIG. 3 shows another embodiment of an apparatus by which an individual vehicle wheel may be relieved as to its axle load.

As shown in FIG. 1, brakes 10 (front, left), 12 (rear, right), 14 (front right), and 16 (rear, left) are pressurized with pressure from a pressure reservoir 22 by way of pilot valves 18, 20. The pressure reservoir 22 forms part of an anti-locking system (not shown), the control device of which is connected through the pressure line 24 (c.f. e.g. U.S. Pat. No. 45 45 240). If the brake pedal 26 is operated (pushed) the two lines leading to the brakes 10 and 14 are connected to the pressure reservoir 22.

The brake pedal 26 is connected in per se known manner with the pilot valves 18, 20 and the anti-locking system.

A processor 30 processes the results of measurements and controls the pilot valves 18, 20 for the individual brakes 10 to 16.

Pressure sensors 32 determine the brake pressure especially in the wheel being retarded for the determination of the coefficient of friction. The result of measurement is entered into the processor 30 which calculates the brake torque in the manner mentioned initially. If desired, also the temperature of the friction linings is measured by the temperature sensors 38.

Moreover, the outside temperature is sensed, and the measuring means may switched on automatically at certain critical temperatures, such as less than +1° C.

Wheel speed sensors 34 determine the slip of the respective wheel being retarded by comparing its speed with that of an unretarded wheel. The slip results from the following formula:

$$\frac{V_{free\ wheel} - V_{retarded\ wheel}}{V_{free\ wheel}} \cdot 100\ [\%]$$

At a given brake torque measured or calculated in the manner specified above, and at an axle load determined by an axle load sensor 36 and entered into the processor 30 the coefficient of friction is inversely proportional to the slip as measured. The specific functional relationships is determined experimentally and the processor 30 is programmed with the experimental data.

Humidity sensors 40 determine the humidity of the air in the area of the wheel and may call up the measuring program automatically at certain intervals if a certain degree of humidity, such as 90% is reached.

The measuring routine is initiated by a switch which is actuated when the brake pedal 26 is operated.

Reference numeral 44 indicates a line for accessories. Such an accessory may be means for indicating instantaneous stopping distance as a function of the coefficient of friction and vehicle speed.

A steering angle switch is provided as input 52 to prevent switch-on of the measuring means when a certain angle of steering lock is exceeded.

An alarm signal indicating means 46 will light up and/or emit a sound signal if the coefficient of friction determined in accordance with the invention in response to the instantaneous vehicle speed fails to reach a predetermined limit value. In addition, the measured coefficient of friction is indicated directly and continuously by the coefficient of friction display means 48. A digital display means 48 also may be gauged in units of the stopping distance rather than in units of the coefficient of friction.

The controller (microprocessor) 30 shown in FIG. 1 is used during a normal brake operation to switch the valves such that a non-driven wheel is disconnected from the master cylinder by one of the valves 18 or 20 whereupon one of the non-driven wheels is pressurized from source 22 or 24 (accumulator or pump) until it has reached a certain slip. In other words, a predetermined slip is put into the controller (microprocessor) 30 and the brake pressure at the one non-driven wheel is increased until said wheel has reached the predetermined slip stored in the controller 30. Axle load 1 is measured. The brake torque t is determined from the product of the brake pressure, the piston surface of the brake caliper, the friction value of the brake pad, and the wheel radius. The brake pressure at the retarded wheel is measured directly. The piston surface area of the brake caliper is a constant. The friction value of the pad is temperature-responsive so that its temperature is measured in a preferred embodiment. It is also possible to apply a lower mean value as the friction if the temperature of the friction pad is not measured. The wheel radius again is a constant.

In this embodiment, the coefficient of friction $\mu$ is determined from the function $$\mu = f(s, 1, t)$$

wherein s is the predetermined slip stored in the controller 30, 1 is the axle load measured by axle load sensor 36 and entered into the controller (microprocessor) 30. Brake torque t is determined as explained above from the brake pressure measured by the pressure sensors 32. From the three values of s, 1 and t, the processor 30 determines the coefficient of friction μ on the basis of experimental data which are stored previously in the processor 30.

In an alternative embodiment of the invention instead of a maximum value of slip being predetermined and stored in the processor 30, a maximum value of brake torque is predetermined and stored. In this embodiment, one of the vehicle wheels is pressurized during normal brake operation at a brake pressure corresponding to the predetermined maximum brake torque and the slip of the braked wheel is determined as explained above. Therefore, all three variables slip s, axle load 1 and brake torque t are known and the coefficient of friction μ is determined on the basis of the equation μ=f (s, 1, t) which is stored in the processor 30 as explained above.

In a preferred embodiment of the invention, both alternative methods for determining the coefficient of friction (first alternative: maximum slip s is predetermined and stored in the processor 30; second alternative: maximum brake torque is predetermined and stored in the processor 30) are combined such that both a maximum brake torque t and a maximum slip s are predetermined and stored in the processor 30. During determining the coefficient of friction, the brake pressure is increased continuously. At the same time the slip is measured continuously and compared with the predetermined, stored maximum slip value. When the predetermined maximum brake torque or the predetermined maximum slip is reached, whichever is reached first, the process is interrupted, i.e. the pressure increase is terminated. At this point, the three variables slip s, brake torque t and axle load 1 are determined and the coefficient of friction μ is calculated on the basis of these three values.

Figure 2:
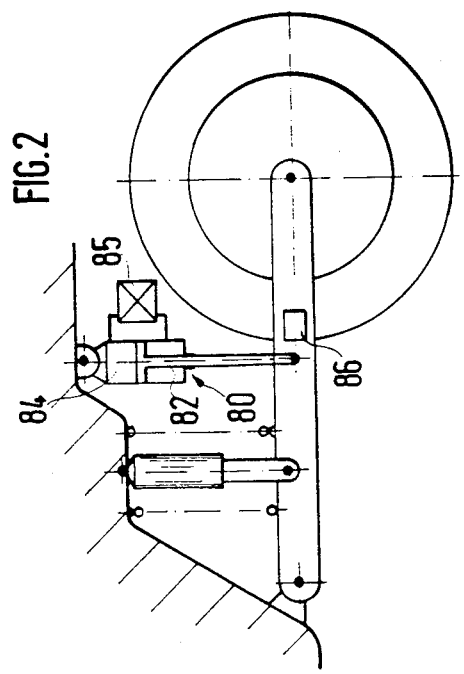
FIG. 2 shows an apparatus for relief of one vehicle wheel.

FIG. 2 illustrates another method of determining the coefficient of friction between a tire and a roadway, wherein again the effect on the travelling of the vehicle and thus any possible irritation of the occupants of the vehicle are reduced to minimum level.

As shown in FIG. 2, a vehicle furnished with a longitudinal link is provided with a lifting cylinder 80 which is pressureless during normal travelling and has a conductive connection between two chambers 82 and 84. Prior to determining the coefficient of friction, pressurized fluid from a reservoir, not shown, is admitted to chamber 82 and a valve 85 positioned between the chambers is closed. When the load determined by the load sensor 86 has been reached, measurement is initiated to determine the coefficient of friction. To this end the wheel which has been lifted in the manner described above, but of course, still has ground contact is retarded. Then the rotational speeds are compared with those of the unretarded wheels for determining the slip. Then, according to one of the above-described methods, the coefficient of friction is determined on the basis of the measured slip, brake torque and axle load.

As the measurement made to determine the coefficient of friction requires only an extremely short period of time, the lifting or pressure relief of the wheel hardly influences the travelling behavior of the vehicle. The measurements described are suppressed in a curve. For this purpose, for example, a steering wheel sensor is provided. It is also possible, for instance, to compare the axle loads. In curves, the axle loads of left and right hand wheels differ so that the measured axle loads may indicate a curve in which the determination of the coefficient on friction is prevented.

FIG. 3 shows a vehicle equipped with a hydropneumatic suspension system with which the relief of the wheel drawn upon for measurement is obtained by raising the pressure at the one side of the suspension so that the other side of the suspension becomes relieved. The two wheels HL (rear, left) and HR (rear, right) are lifted selectively by a control means 89 acting on hydraulic piston and cylinder arrangements 87 or 87'.

Figure 4:
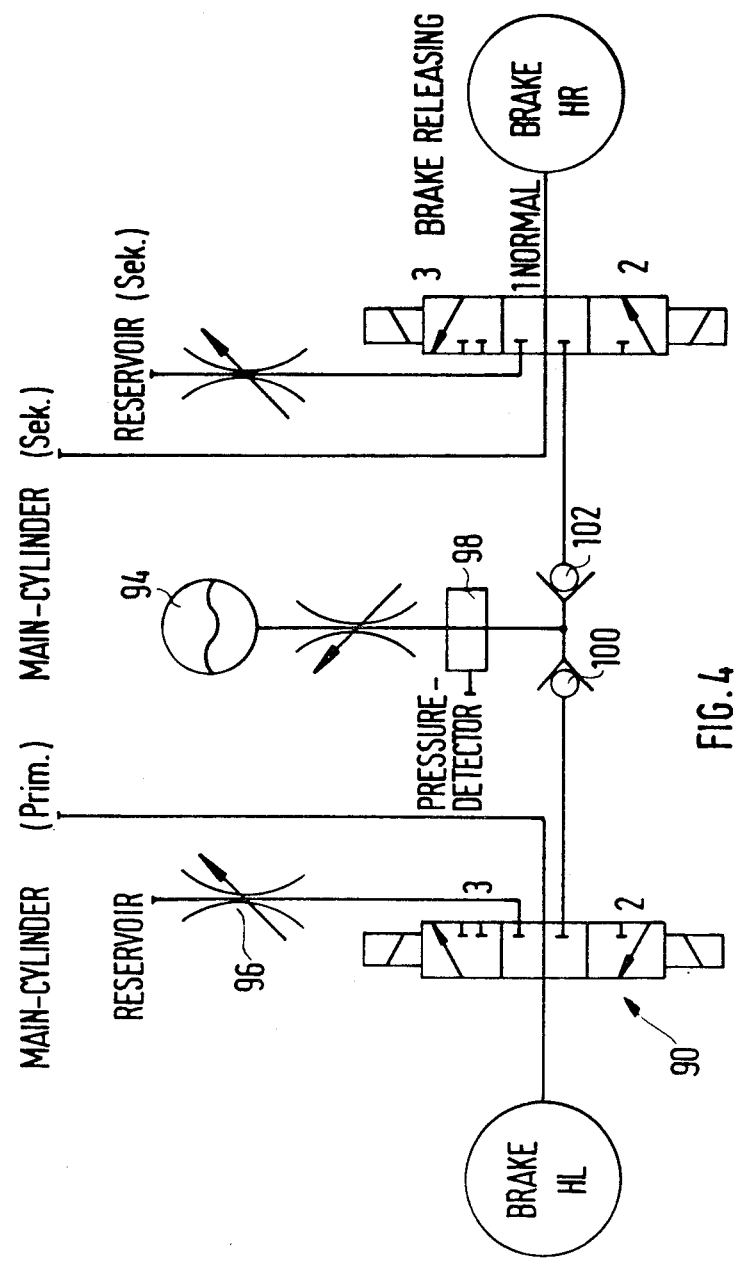
FIG. 4 is another block diagram of an apparatus by means of which a wheel may be retarded by a certain slip during normal vehicle brake application.

FIG. 4 shows a block diagram of a device by which the determination of the coefficient of friction can be made during normal application of the service brake. In this embodiment the axle load is not reduced of any wheel, rather the coefficient of friction is determined as was described with reference to FIG. 1. The brakes at the rear left side (HL) and at the rear right side (HR) are shown. Two control valves 90, 92 each have three positions 1, 2, and 3. In position 1 (normal position) the brake is connected to the master cylinder and a pressure source 94 is blocked. As a result normal braking effect will be obtained. Likewise blocked is a reservoir connection 96. In the second position (test position) the brake communicates with the pressure source 94 and controlled pressure sensor 98. The master cylinder and the reservoir connections are blocked as well. In the third position (brake relief) the brake is connected through the reservoir connection 96 in the form of a throttle. The master cylinder and the pressure source 94 are blocked. The master cylinder connections are designated "Hz (Prim.)" relating to the primary end and "Hz (Sek.)" relating to the secondary end. In determining the coefficient of friction at the left side, the left control valve 90 is in position 2, while the right valve 92 is in position 3. When carrying out measurements at the right side, the right valve 92 is in position 2 and the left valve 90 is in position 3 and returns to the brake release position after the test. Check valves 100, 102 separate the rear axle brake circuits.

I claim:

1. A mehod for determining the coefficient of friction between a vehicle tire and a roadway comprising:
   (a) pressurizing during normal brake operation one of the vehicle wheels at a higher brake pressure than another wheel,
   (b) comparing the rotational speed of said one wheel with the rotational speed of the other wheel for determining the wheel slip of said one wheel from the difference in the rotational speeds of the other wheel and said one wheel when the pressure on said one wheel reaches a value indicative of a predetermined braking torque on said one wheel;
   (c) measuring the axle load on said one wheel; and
   (d) determining the coefficient of friction between the tire of said one wheel and said roadway from said measured axle load, said predetermined braking torque, and the inverse proportion of said determined wheel slip.

2. A method according to claim 1, characterized in that said one wheel is pressurized with a brake pressure which is at a level and effective over a period of time so selected that the straight-on travel of the vehicle is substantially undisturbed.

3. The method claimed in claim 2, characterized in that said level of brake pressure is varied automatically as a function of the vehicle speed.

4. The method as claimed in claim 2, characterized in that said braking period of time is varied automatically as a function of vehicle speed.

5. A method for determining the coefficient of friction between a vehicle tire and a roadway comprising:
   (a) pressurizing during normal brake operation one of the vehicle wheels at a higher brake pressure than another;
   (b) comparing the rotational speed of said one wheel with the rotational speed of the other wheel for determining the wheel slip of said one wheel from the difference in the rotational speeds of the other wheel and said one wheel;
   (c) terminating the pressurizing of said one wheel when said determined wheel slip of said one wheel reaches a predetermined value;
   (d) measuring the brake pressure indicative of a braking torque at the time when said predetermined wheel slip is reached;
   (e) measuring the axle load of said one wheel;
   (f) determining the coefficient of friction between the tire of said one wheel and said roadway from said measured axle load, said measured brake pressure and said predetermined wheel slip.

6. A method according to one of the claims 1 or 5, characterized in that said another vehicle wheel is free rolling.

7. A method according to claim 5, characterized in that said one wheel is pressurized with a brake pressure which is at a level and effective over a period of time so selected that the straight-on travel of the vehicle is substantially undisturbed.

8. The method claimed in claim 7, characterized in that said level of brake pressure is varied automatically as a function of the vehicle speed.

9. The method as claimed in claim 7, characterized in that said braking period of time is varied automatically as a function of vehicle speed.

10. The method as claimed in claim 1 or 5, including signalling an alarm if the determined coefficient of friction is smaller than a given value.

11. The method as claimed in claim 1 or 5, including determining the coefficients of friction between the roadway and the tire of two wheels and signalling an alarm whenever a predetermined maximum difference between the coefficients of friction between the roadway and the tires of said two wheels is exceeded.

12. The method as claimed in claims 1 or 5, including determining a stopping distance to be expected from the coefficient of friction between the tire of said one wheel and the roadway and the speed of the vehicle and indicating said stopping distance.

13. The method as claimed in claims 1 or 5, including preventing operation of a determination of the coefficient of friction when the pressure in a master cylinder of the vehicle's brake system exceeds a predetermined value for a predetermined period of time.

14. The method as claimed in claims 1 or 5, including preventing the determination of the coefficient of friction whenever a steering wheel is turned by a certain angle.

15. The method as claimed in claims 1 or 5, wherein said one and said another wheel are non-driven wheels of the vehicle.

16. A method as claimed in claims 1 or 5, wherein the axle load of said one wheel is reduced by lifting said one wheel during pressurizing it at a higher brake pressure than another wheel.

17. The method as claimed in claims 1 or 5, including determining a distance of said vehicle to another vehicle from a radar distance measuring system, measuring the speed of said vehicle, calculating a stopping distance on the basis of the determined coefficient of friction and said vehicle speed, comparing said stopping distance with said determined distance to said other vehicle and sounding an alarm if the stopping distance is fallen below said distance to said other vehicle.

18. A method of determining the coefficient of friction between a tire on one wheel of a vehicle and a roadway, the wheels of said vehicle being braked by pressurized fluid, comprising:
   (a) pressurizing the brake of said one wheel to a greater extent than another brake of another wheel;
   (b) at a predetermined pressure measuring the speed of said one wheel relative to said other;
   (c) determining the slip of said one wheel from the difference in the rotational speeds of said one and said other wheels;
   (d) measuring the axle load on said one wheel; and
   (e) calculating the actual coefficient of friction between a tire of said one wheel and the roadway from the measured axle load and the inverse proportion of the determined slip of said one wheel.

* * * * *